(12) United States Patent
Vainola et al.

(10) Patent No.: US 8,060,094 B2
(45) Date of Patent: Nov. 15, 2011

(54) TRANSMISSION OF MESSAGES BETWEEN NETWORK ENTITIES IN A WIRELESS COMMUNICATIONS NETWORK

(75) Inventors: Kati Vainola, Hikiä (FI); Juha Bäck, Helsinki (FI)

(73) Assignee: Nokia Corporation, Espoo (FI)

( * ) Notice: Subject to any disclaimer, the term of this patent is extended or adjusted under 35 U.S.C. 154(b) by 1246 days.

(21) Appl. No.: 10/871,594

(22) Filed: Jun. 21, 2004

(65) Prior Publication Data
US 2005/0208972 A1    Sep. 22, 2005

(30) Foreign Application Priority Data
Mar. 16, 2004 (GB) .................................. 0405875.6

(51) Int. Cl.
*H04W 36/00* (2009.01)
(52) U.S. Cl. ...................... 455/437; 370/395.5; 370/473
(58) Field of Classification Search .................. 370/328, 370/331, 395.5, 473; 455/436, 437, 560
See application file for complete search history.

(56) References Cited

U.S. PATENT DOCUMENTS

| | | | | |
|---|---|---|---|---|
| 6,178,337 B1 * | 1/2001 | Spartz et al. | ................ | 455/561 |
| 6,591,099 B1 | 7/2003 | Syed et al. | | |
| 6,650,899 B1 * | 11/2003 | Stumpert | ...................... | 455/436 |
| 6,788,944 B2 * | 9/2004 | Jiang | .............................. | 455/450 |
| 6,845,236 B2 * | 1/2005 | Chang | ......................... | 455/414.1 |
| 6,947,394 B1 * | 9/2005 | Johansson et al. | ............. | 370/282 |
| 7,095,717 B2 * | 8/2006 | Muniere | ....................... | 370/232 |
| 7,103,037 B2 * | 9/2006 | Roque et al. | .................. | 370/356 |
| 7,164,693 B2 * | 1/2007 | Turina et al. | ................... | 370/467 |
| 7,257,403 B2 * | 8/2007 | Nikkelen | ....................... | 455/436 |
| 2002/0093981 A1 * | 7/2002 | Turina et al. | .................. | 370/467 |
| 2003/0227883 A1 * | 12/2003 | Rimoni et al. | ................ | 370/331 |
| 2006/0019634 A1 * | 1/2006 | Hawkes | ........................ | 455/411 |
| 2007/0115945 A1 * | 5/2007 | Gass et al. | ..................... | 370/356 |
| 2007/0150616 A1 * | 6/2007 | Baek et al. | .................... | 709/246 |

FOREIGN PATENT DOCUMENTS
| | | |
|---|---|---|
| WO | WO 96/21999 | 7/1996 |
| WO | WO 03/096594 A2 | 11/2003 |

OTHER PUBLICATIONS

ETSI VA "Signaling Transport Mechanism Specification For the Base Station System-Mobile-Services Switching Centre (BSS-MSC) interference (Release 5)"; Techinical Specification Group GSM Edge Radio Access Network, Dec. 2002. XP002328728; 3$^{rd}$ Generation Partnership Project.

Ericsson Siemens: "Addition of further LCS functionality in GSM Release 98" 3GPP TSG_CN#6, Dec. 13-15, 1999; XP002328728 ETSI SMG3 Plenary Meeting 6.

*Correction to the Coding of SNA Access Information IE*, 3GPP TSG-GERAN #17, Budapest, Hungary, Nov. 17-21, 2003; Change Request.

* cited by examiner

*Primary Examiner* — Christian A Hannon
(74) *Attorney, Agent, or Firm* — Alston & Bird LLP

(57) ABSTRACT

A method of transmitting data between first and second network entities in a communications network, the method including, transmitting from the first network entity an establishment message providing a first indication which indicates whether the first network entity is capable of handling extended messages, receiving the message at the second network entity and returning to the first network entity an establishment response which provides the first indication in respect of the second network entity, and transmitting a data message from the first network entity to the second network entity, the data message selectively being an extended message in dependence on the first indication received in the response message, the data message further providing a second indication which indicates whether or not the data message is an extended message.

31 Claims, 7 Drawing Sheets

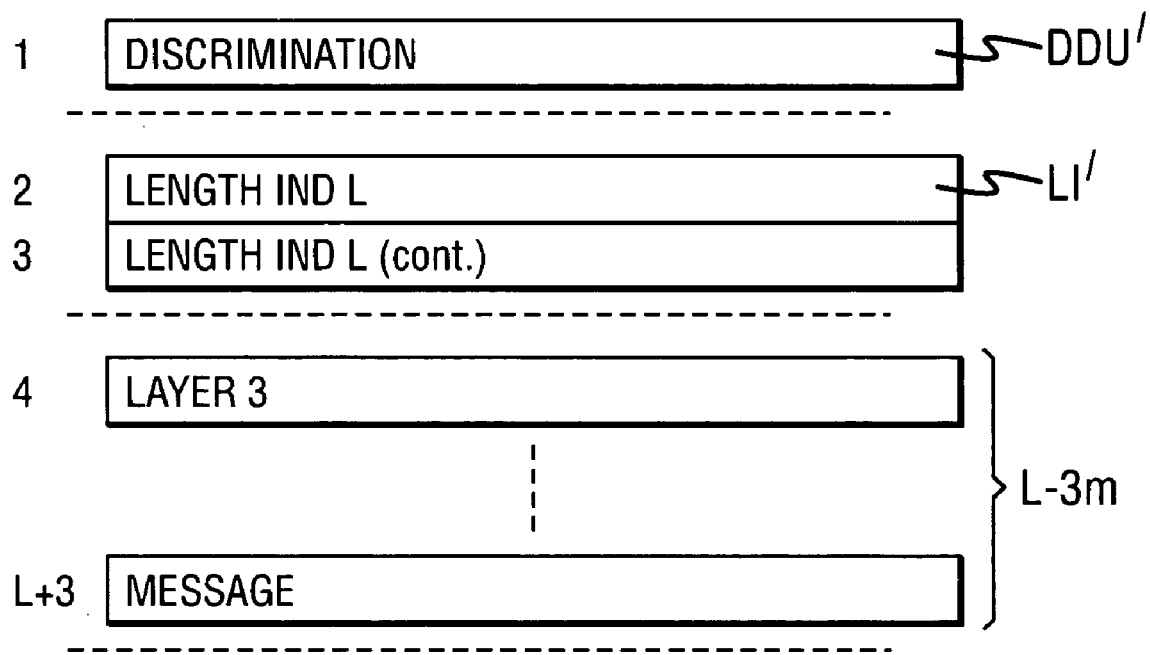

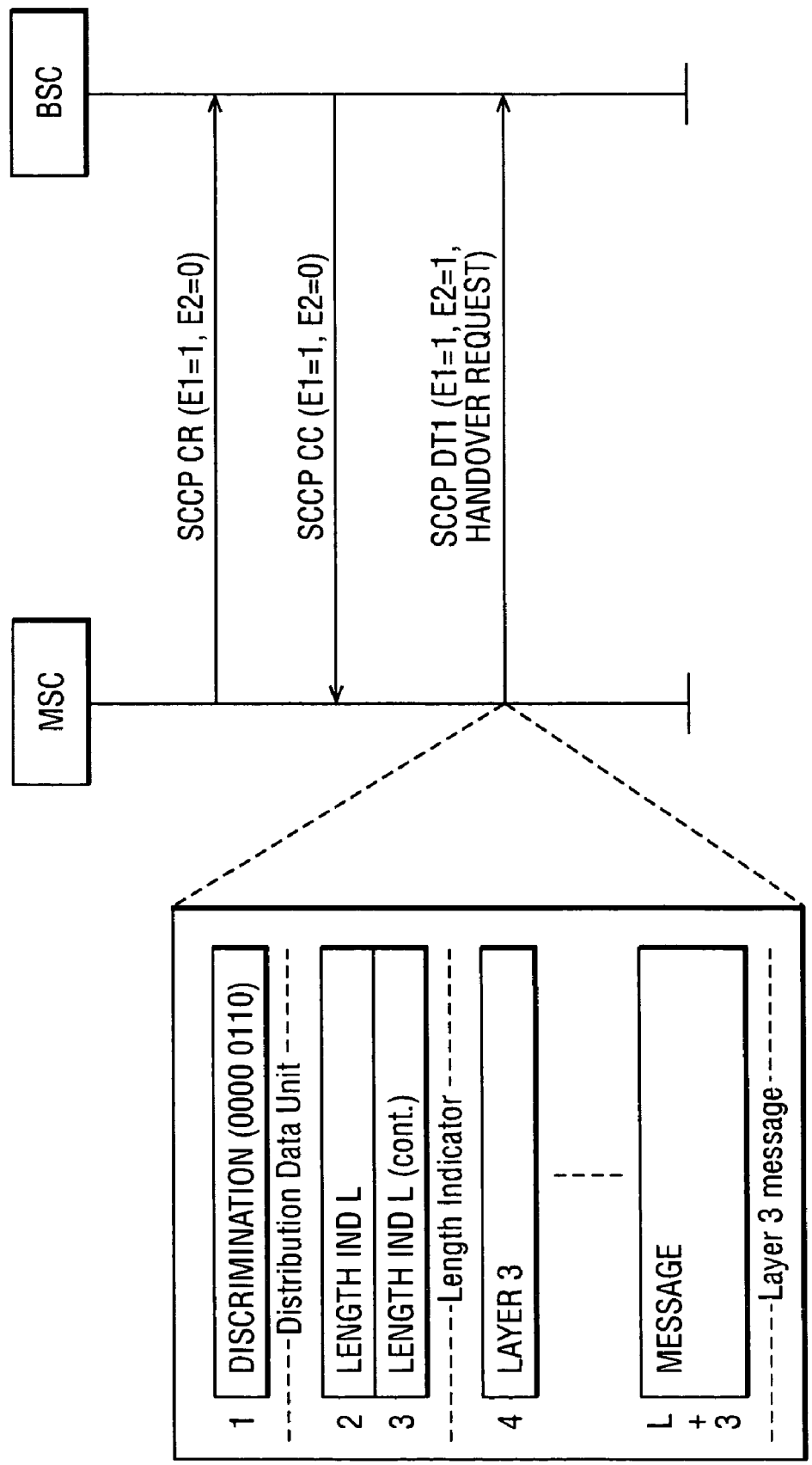

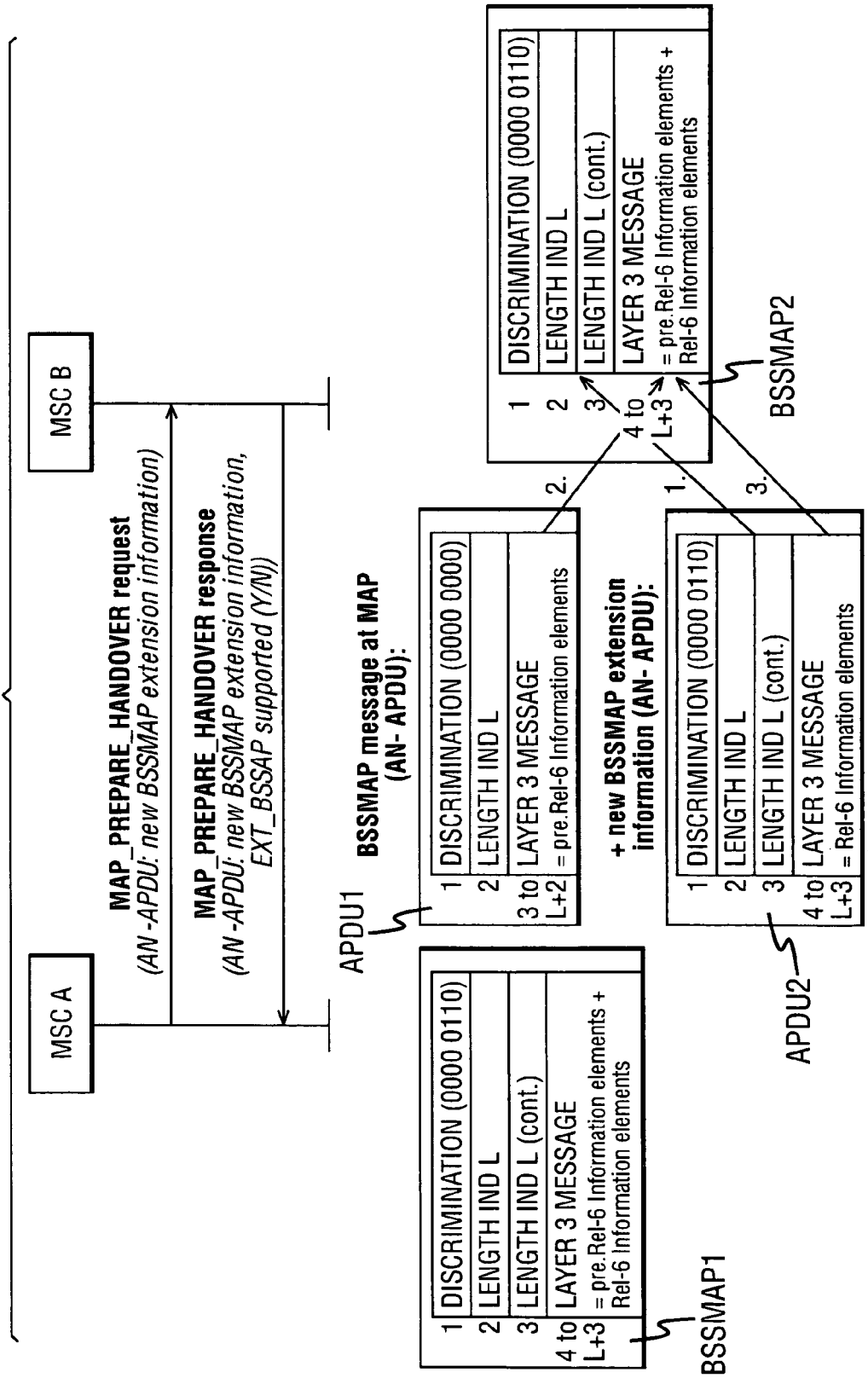

TRANSMISSION OF MESSAGES BETWEEN NETWORK ENTITIES IN A WIRELESS COMMUNICATIONS NETWORK

The present invention relates to the transmission of messages between network entities in a wireless communications network. The invention is particularly but not exclusively concerned with the transmission of messages across the A-interface between a base station sub-system (BSS) and a mobile switching centre (MSC), and over the E-interface between two mobile switching centres.

FIG. 1 represents a known GSM architecture. A user terminal in the form of a mobile station MS communicates across a radio interface Um with a base station sub-system BSS. The base station sub-system BSS comprises a plurality of base stations BTS and a set of base station controllers BSC. In FIG. 1, two BTSs are shown in communication with one base station controller, and a further base station controller is shown although its associated base stations are not shown. It will readily be appreciated that in practice there is a large number of base stations and base station controllers forming part of any base station sub-system. As is well known, the base stations are geographically arranged in a cellular network, with each base station communicating with mobile stations in one or more adjacent cell. In the GSM architecture, the interface between the base stations and their associated base station controller is referred to as the Abis interface. The base station sub-system BSS is in communication with a network sub-system or core network CN. The network sub-system comprises a number of network entities, such as the home location register (HLR), virtual location register (VLR), etc which are well known in the art and are not discussed further herein. The entities in core network CN support the operations of a mobile switching centre MSC which is in communication over the A-interface with one or more base station controller that it is managing. The A-interface can be any suitable communication path, whether wired or wireless and there is a well-known layered protocol for communicating information between the BSCs and the MSC across the A-interface. The mobile switching centre MSC is during inter-MSC handover (here referred as MSC-A i.e. the controlling MSC on which the call was originally established) in communication with another mobile switching centre MSC (here referred as MSC-B i.e. the MSC to which the MS is handed over) across an interface which is referred to as the E-interface. The gateway mobile switching centre GMSC which provides an edge function with a public land mobile network (PLMN). Once again, a standard protocol allows communication between the MSC of the core network and the GMSC.

The present invention is concerned with information transfer from the base station sub-system BSS and the mobile switching centre MSC over the A-interface, and information transfer between the mobile switching centre MSC and another MSC over the E-interface. One particular type of information transferred between these entities is a base station sub-system application part (BSSAP) message. The message is transferred as part of the signalling connection control part (SCCP) of the information transfer protocol which is used across the A-interface. The BSSAP message is transferred over the E-interface as the contents of the signalling information in a AN-APDU parameter (access network-application protocol data unit).

The standard 3GPP TS 48.006 (signalling transport mechanism specification for the BSC-MSC interface) specifies the base station sub-system application part (BSSAP) user function of the signalling connection control part SCCP. The BSSAP user function is sub-divided into two separate sub-functions:

1. A direct transfer application sub-part (DTAP) which is used to transfer messages between the mobile switching centre MSC and the user terminal MS.
2. The BSS management application sub-part (BSSMAP) which supports other procedures between the mobile switching centre MSC and the base station sub-system BSS which are related to the user terminal MS, such as resource management, handover or control, or to a cell within the base station sub-system or to the whole base station sub-system. The standard 3GPP TS 48.008 sets out a description of the layer-3 protocol for the BSSMAP information exchange.

The DTAP and BSSMAP layer-3 messages between the MSC and BSS are contained in the user data field of exchanged SCCP frames. The user data field is a mandatory parameter of data frames and always contains either a DTAP or BSSMAP message.

A distribution function located in an intermediate layer of protocol between the SCCP layer and layer-3 (the distribution sub-layer) performs discrimination between data related to the DTAP and BSSMAP sub-parts. The protocol for this layer consists of management of a distribution data unit, in which a discrimination parameter D indicates whether the message is a DTAP or BSSMAP message.

FIG. 2 shows the user data field structure of a BSSMAP message. The message comprises a distribution data unit octet DDU labelled DISCRIMINATION, and length indicator octet LI labelled LENGTH IND L and a number of different octets labelled LAYER-3 and MESSAGE (with octets in between which are not shown) which comprise the actual layer-3 message L-3m. The distribution data unit DDU comprises a discrimination parameter D which is coded on one octet as shown in FIG. 3. That is, the octet DISCRIMINATION comprises a discrimination bit D which, when the message is a BSSMAP message is set to a "not transparent" value zero (DTAP messages have the discrimination parameter D set to the "transparent" value one, which allows direct transfer of this part of the message from the BSS to the user terminal MS).

The length indicator LI is coded in one octet and is the binary representation of the number of octets of the subsequent layer-3 message parameter L-3m.

With a length indicator of one octet, it is possible to indicate a BSSMAP message having a maximum length of 255 octets. This represents a limitation on the length of the BSSMAP message, and as requirements on information transfer across the A and E interfaces increase, this is seen as a limiting factor for the introduction of new information to be transmitted for features which could otherwise be transmitted in the BSSMAP messages.

For example, it would be desirable to consider incorporating the following types of data into BSSMAP messages, and the incorporation of such data could cause the BSSMAP messages to exceed the currently restricted message length.

Rel-5 SNA [Shared Network Area] Access Information information element IE (in HANDOVER REQUEST and COMMON ID messages at E-interface).

Proposed Rel-6 SNA Access Information IE to BSS at A-interface also and related connectionless information, e.g. possible Information Transfer procedure.

Rel-5 Cell Load Information within Old BSS to New BSS Information IE.

Old BSS to New BSS Information IE future additions in general.

Source RNS [Radio Network Subsystem] to target RNC [Radio Network Controller] transparent information (UMTS) IE future additions in general (note that the contents of this transparent IE is not controlled by GSM Edge Radio Access Network GERAN).

It would be desirable to remove the limit on the BSSMAP message length which is imposed by coding the length indicator as one octet.

According to one aspect of the present invention there is provided a a method of transmitting data between first and second network entities in a communications network, the method comprising: transmitting from the first network entity an establishment message providing a first indication which indicates whether the first network entity is capable of handling extended messages; receiving the message at the second network entity and returning to the first network entity an establishment response which provides said first indication in respect of the second network entity; and transmitting a data message from the first network entity to the second network entity, said data message and selectively being an extended message in dependence on the first indication received in the response message, said data message further providing a second indication which indicates whether or not the data message is an extended message.

The first indication can be handled at the second network entity in a connection establishment case, or stored for later use in a connectionless exchange. Similarly, the second indication can be treated in these ways at the first network entity.

In the described embodiment, a length indicator in the message indicates the length of the message. The length indicator itself varies in length, depending on whether or not the message is an extended message. Therefore, in the preferred embodiment, the length of the length indicator flags whether or not it is an extended message. In this case, it is clear the support for an extended message means support for an extended length indicator. In some cases, an extended length indicator might be used even where the message length does not warrant it, but in that case it would still be considered an extended message.

A further aspect of the invention provides a communications network comprising first and second network entities in communication with each other over an interface, wherein the first network entity comprises means for transmitting an establishment message providing a first indication which indicates whether the first network entity is capable of handling extended messages; the second network entity comprises means for receiving the message and for generating an establishment response which provides said first indication with respect to the second network entity; and wherein the first network entity comprises means for transmitting a data message which is selectively an extended message in dependence on the first indication received in the response message, wherein the first network entity includes means for providing a second indication in the data message which indicates whether or not the data message is an extended message.

Another aspect of the invention provides a network entity for use in a wireless communications network which comprises means for formulating a message having a data structure which includes a data distribution unit providing first and second extension indications, and a variable length message part wherein the first extension indication indicates whether the network entity is capable of handling extended messages, and the second extension indication indicates whether or not the message is an extended message.

A further aspect of the invention provides a data structure comprising a data distribution unit which includes first and second extension indications and a variable length message part wherein the first extension indication provides an indication as to whether or not a network entity transmitting a message in accordance with the data structure is capable of handling extended messages, and wherein the second extension indication indicates whether or not the message is an extended message.

A different aspect of the invention provides a method of transmitting data between first and second network entities in a wireless communications network, the method comprising: converting at the first network entity a data message including basic data and extension data into a first data unit including the basic data and a second data unit including the extension data; transmitting the first and second data units to the second network entity; and if the second network entity is capable of handling extension data, reconstructing the message from the first and second data units, and if the second network entity is not capable of handling extension data, constructing a message using only the basic data from the first data unit and ignoring the extension data from the second data unit.

For a better understanding of the present invention and to show how the same may be carried into effect, reference will now be made by way of example to the accompanying drawings, in which:

FIG. 4 shows an extended user data field structure in accordance with one embodiment of the invention;

FIG. 5 shows the data distribution unit of the user data field structure of FIG. 4;

FIG. 6 is a schematic diagram illustrating the message exchange between an MSC and a BSC in accordance with one embodiment of the invention;

FIG. 11 illustrates a different aspect of the invention for use between two mobile switching centres.

Figure 1:
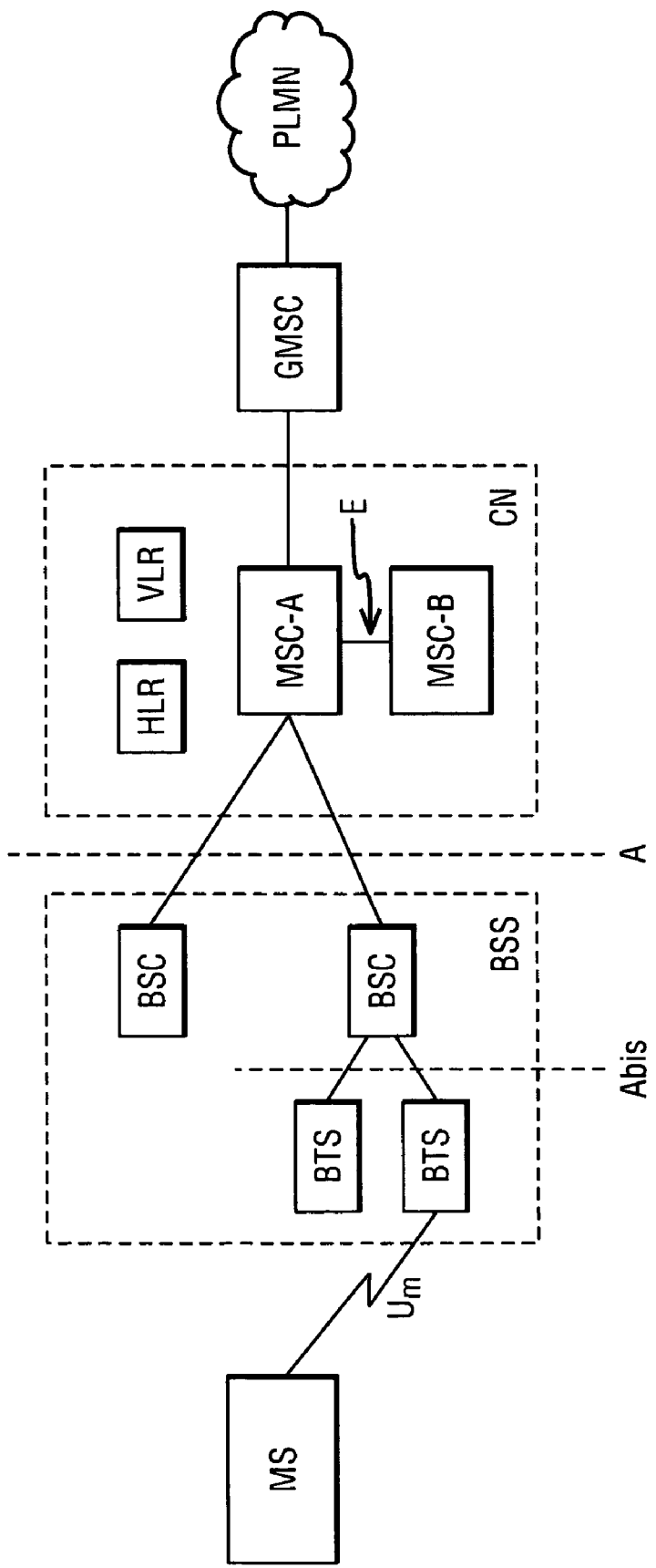
FIG. 1 is a schematic diagram of an architecture of a known wireless communication system.
Figures 2, 3:
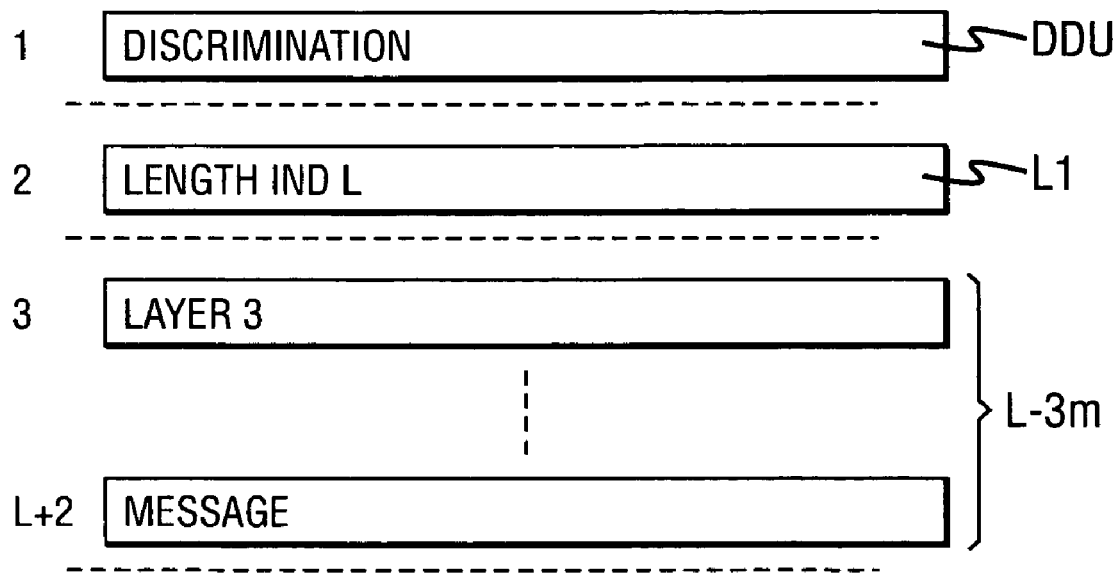
FIG. 2 shows the user data field structure of a BSSMAP message.
FIG. 3 shows the data distribution unit of the user data field structure of FIG. 2.

The basic architecture of a GSM network, together with the structure of an existing BSSMAP user data field has already been described with reference to FIGS. 1 and 2. Reference will now be made to FIG. 4 to illustrate an embodiment of the invention in which the length indicator LI' in the user data field of the BSSMAP message comprises two octets which are labelled LENGTH IND L and LENGTH IND L (cont.). Other parts of the user data field remain as illustrated in FIG. 2, apart from a change to the parameters held in the distribution data unit. The distribution data unit DDU' is shown in FIG. 5. In addition to the discrimination bit D which is set to the "not transparent" value zero to indicate that this is a BSSMAP message, bits 2 and 3 are denoted as BSSMAP extension bits E1 and E2 respectively. The extension bit E1 is a parameter to indicate that there is support for BSSMAP extension, and the extension bit E2 is a parameter to indicate that the BSSMAP extension is in use. These are referred to in the following in shorthand as the support extension bit E1 and the usage extension bit E2. It will readily be appreciated that although single bit parameters are illustrated, any suitable indicators could be used as a support extension indicator and usage extension indicator accordingly. Moreover, the bit position within the DDU can be freely defined. In a particularly preferred embodiment they are at bits 6 and 7, rather than bits 2 and 3 as illustrated.

The support extension bit E1 is set to the "extended BSS-MAP supported" value one if the network element sending the message supports the usage of extended BSSMAP. The usage extension bit E2 is set to the "extended BSSMAP in use" value one if the extended BSSMAP message is used.

FIG. 6 illustrates how the described embodiment of the invention is implemented in the transfer of messages across the A-interface between the base station controller BSC of the base station sub-system BSS and the mobile switching centre MSC. The structure of the message is shown on the left hand side of FIG. 6, which shows a distribution data unit DDU' being illustrated with the discrimination bit D set to the "non-transparent" value zero, and the extension indicators E1, E2 both set to the value one. In fact, as will become clear in the following, the values of the extension bits are altered as the message exchange progresses, in the manner as will now be described. FIG. 6 illustrates the message exchange in an MSC initiated connection establishment case where the connection establishment is undertaken by the MSC as soon as the MSC decides to perform an external handover to a new cell (governed by a new BSC). A connection request message CR is sent to the base station controller BSC. The user data field of this message contains a BSSMAP HANDOVER REQUEST message if the HANDOVER REQUEST message does not exceed the limit of CR data content.

In the connection request message CR, the distribution data unit DDU has the support extension bit E1 set to the value one to indicate that BSSMAP extension is supported if the MSC supports the usage of extended BSSMAP, and the extension bit E1 set to zero if it does not. In FIG. 6, the case is shown where the connection request message CR contains in the distribution data unit DDU' the extension bit E' set to the value one. The usage extension bit E2 is set to the value zero, because it is not yet possible to use extended BSSMAP messages because the support for extended BSSMAP messages at the receiving side is not yet known. When the connection request message CR is received by the BSC, the BSC allocates the necessary resources for the requested handover. In addition, it ascertains from the support extension indicator E1 whether or not the transmitting MSC supports extended BSS-MAP messages. If the BSC itself does not support extended BSSMAP messages, it simply ignores the received indicators E1, E2. A connection confirm message CC is returned to the MSC. It may contain the BSSMAP HANDOVER REQUEST acknowledgement or queuing indication message in the user data field if the HANDOVER REQUEST message was included in CR. In the distribution data unit of the returned connection confirmed message CC, the BSC also indicates whether or not it supports extended BSSMAP messages. The case where it supports BSSMAP extended messages is illustrated in FIG. 6, that is with the support indicator E1 set at the value one. The usage indicator E2 is in value 0 in the connection confirm message CC. If both the MSC and BSS support the extended BSSMAP messages, and the BSSMAP HANDOVER REQUEST message exceeded the maximum length for a conventional BSSMAP message which could be indicated by one octet, the MSC sends the BSSMAP HANDOVER REQUEST message within an SCCP Data Type 1 DT1 message indicating in the data distribution unit DDU' the extension indicators E1, E2 both with values one. That is, indicating that the extended BSSMAP is supported and used. This case is shown in FIG. 6.

Figure 7:
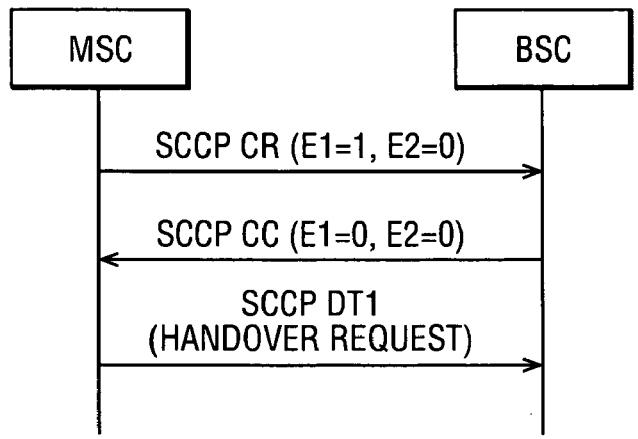
FIGS. 7 and 8 show a message exchange between an MSC and a BSC in accordance with embodiments of the invention.

FIG. 7 illustrates the case where the BSS does not support extended BSSMAP messages. That is, the connection confirm message CC is returned with the extension indicators E1 and E2 both indicating a value of zero which is the backwards compatible value. In this case, the MSC assumes that the BSS is not capable of handling the enhanced standard (Rel-6) and so removes any Rel-6 or other enhancement information elements (referred to sometimes as extension data) from the HANDOVER REQUEST message to be able to send the message for the BSC. Without enhancements, the assumption is made that the BSSMAP message that is sent to the BSC will not exceed the normal BSSMAP message length.

Figure 8:
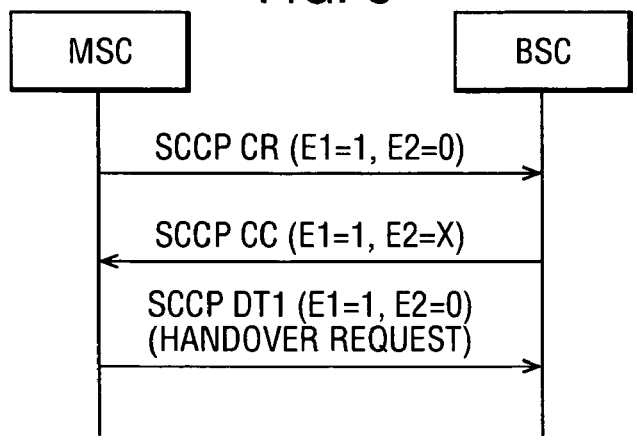

FIG. 8 illustrates the case where both the MSC and BSS support extended BSSMAP messages, but the BSSMAP HANDOVER REQUEST message does not reach the maximum conventional BSSMAP message indicated with one octet. In this case, the MSC sends the BSSMAP HANDOVER REQUEST message within the SCCP DT1 message by indicating the support indicator E1 with a value of one, and the usage indicator E2 with a value of zero.

Figure 9:
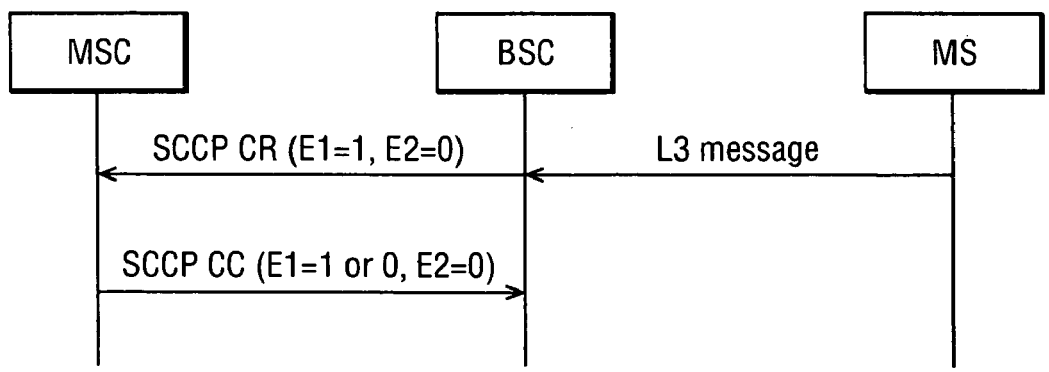
FIG. 9 shows the exchange of messages in a BSC initiated exchange.

FIG. 9 illustrates the case where connection establishment is initiated by the BSC. In this case connection establishment is performed when the BSC receives the first layer-3 message from user terminal MS. This message, which could for example be LOCATION UPDATING REQUEST, CM-SERVICE REQUEST, CM-REESTABLISHMENT, IMSI DETACH, PAGING REQUEST or IMMEDIATE SETUP, is transferred to the MSC in a BSSMAP message (COMPLETE L3 INFORMATION) which is included in the user data field of SCCP connection request message CR. Even if the content of the BSSMAP COMPLETE L3 INFORMATION message does not exceed the message length limitation for the connection request message, the BSS indicates its support for extended BSSMAP messages by setting the support indicator E1 to one so that the MSC is advised of its capabilities. The MSC indicates to the BSC in the connection confirm message CC whether or not it supports extended BSSMAP messages by setting its indicator E1 accordingly. This information is valid for the BSS if it needs to dispatch messages that exceed the maximum conventional BSSMAP message lengths and it itself can use extended BSSMAP messages.

Figure 10:
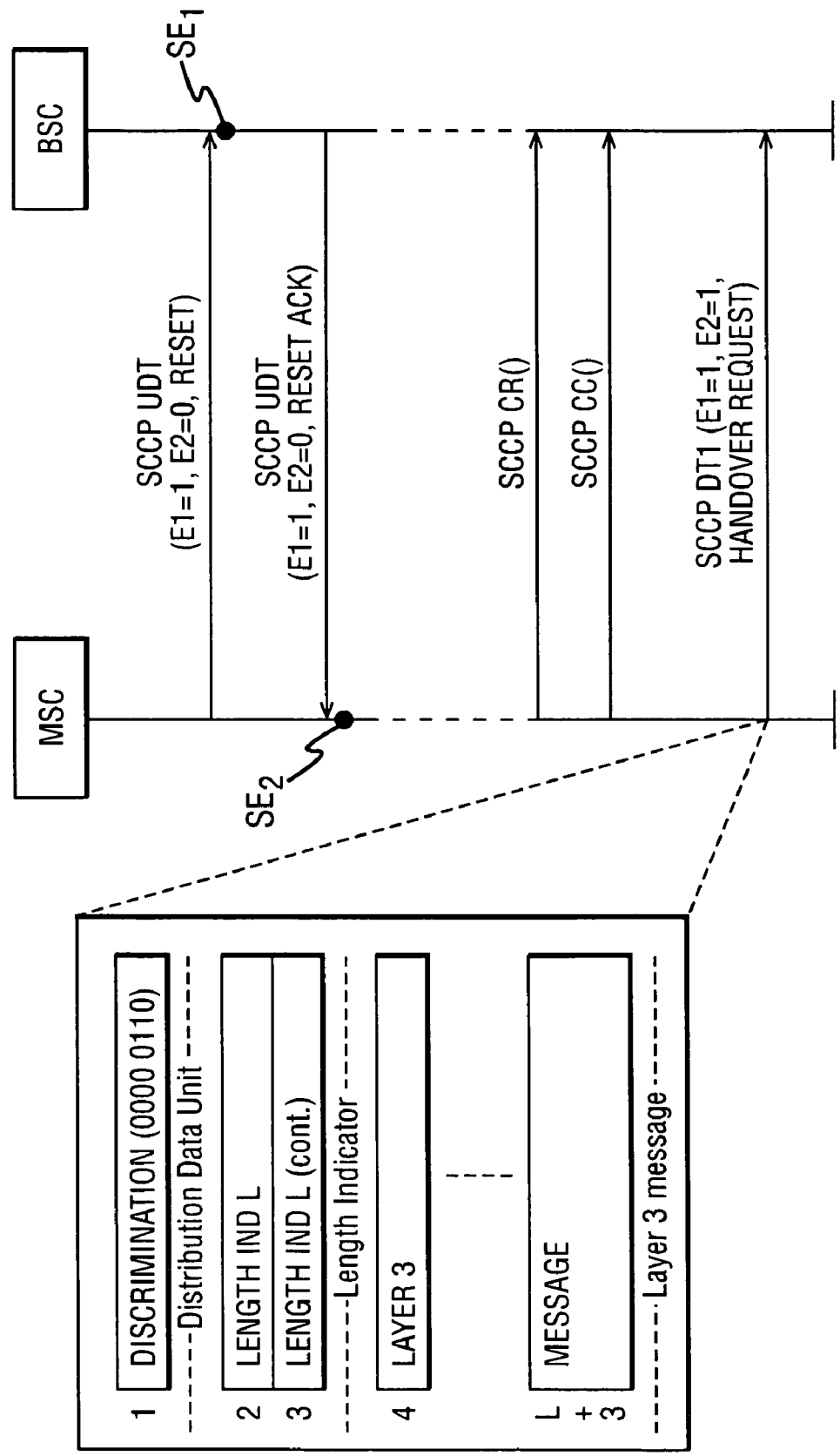
FIG. 10 shows an alternative embodiment and illustrates message exchange between an MSC and BSC with storage capability.

There follows a description of an alternative example as illustrated in FIG. 10 where the extension indicators are used in RESET and RESET ACKNOWLEDGE messages. The purpose of the reset procedure is to initialise the BSC and MSC in the event of a failure. A reset procedure is also typically performed when the signalling link between the BSS and MSC is taken into use. The reset procedure uses the connectionless mode of the SCCP. In this example, the extension indicators are provided in the RESET and RESET ACKNOWLEDGE messages, and they are analysed and stored on receipt. The storage is indicated diagrammatically by storage elements SE1 and SE2 in FIG. 10. This allows subsequent connection establishment to be carried out in a normal manner, without the need for the SCCP connection request message CR to send user data. The long BSSMAP message can be sent within the SCCP DT1 message by using the distribution data unit DDU' and setting the extension indicators E1, E2 accordingly to both have the value one, assuming that both the MSC and BSC have previously indicated that they support extended BSSMAP messages.

Another aspect of the invention can be implemented over the E interface between the mobile switching centre MSC-A and the mobile switching centre MSC-B. FIG. 11 illustrates this variant. In FIG. 11, a first mobile switching centre MSC-A is shown in communication with a second mobile switching centre MSC-B, and it can be considered that the interface between the two mobile switching centres is the E-interface. The BSSMAP data is transferred over the E-interface as the contents of the signalling information in an AN-APDU application protocol data unit parameter as described in the standard 3GPP TS 29.002. The BSSMAP data consists of a BSSMAP header and BSSMAP layer-3 message. The BSSMAP header contains, as specified in 2GPP TS 48.006 and similarly as discussed above, a discrimination parameter and a length indicator. Sending of extended BSSMAP message over E-interface is done in the following way, which doesn't require MSC-A to know whether MSC-B supports extended BSSAP messages before sending the message. A first mobile switching centre MSC-A dispatches to the second mobile switching centre MSC-B a HANDOVER REQUEST message. In the described example, the length of the message exceeds the limit of 255 octets and therefore an extended BSSMAP message is required to be used. Initially, the first mobile switching centre MSC-A does not know whether or not the second mobile switching centre MSC-B supports the extended BSSMAP messages. The HANDOVER REQUEST message is carried within a map_prepare_handover request AN-APDU parameter. In the present case, it is assumed that information elements which are pre-Rel-6 (the proposed new standard) can be carried within a message where the code length does not exceed the limit of 255 octets. It is further assumed that information elements pertaining to Rel-6 will inevitably result in a longer message than the pre-described limit. The first mobile switching centre MSC-A transmits a message with a first AN-APDU1 (as normally) which has pre-Rel-6 information elements of the HANDOVER REQUEST message in the L-3m field of the data structure, and also includes a further AN-APDU2 which has a new Rel-6 parameter, in the form of Rel-6 information elements in its L-3m field. This is referred to in FIG. 11 as the BSSMAP extension information ADPU. That is, the BSSMAP message which is received at the first mobile switching centre MSC-A, which is in the format described above with reference to FIGS. 4 and 5, is converted into two AN-APDUs which hold pre-Rel-6 information elements (so-called basic data) and Rel-6 information elements (so-called extension data) respectively. This is shown in the data structure of FIG. 11 labelled BSSMAP1. The BSSMAP message at MSC-A has a discrimination parameter, a two octet length indicator and a layer-3 message which includes pre-Rel-6 information elements and Rel-6 information elements. The first AN-APDU1 includes a discrimination parameter in which the first and second extension indicators E1 and E2 are both set to zero, because this AN-APDU contains only basic data and behaves like a normal BSSMAP message. The second AN-APDU2 with the extension data has the extension indicator bits E1 and E2 both set to one in the discrimination parameter, a two octet length indicator and a layer-3 message containing Rel-6 information elements (extension data). When the map_prepare_handover request is received at the second mobile switching centre MSC-B, if that mobile switching centre can support extended BSSMAP messages, it combines the original BSSMAP HANDOVER REQUEST message based on length information received in the new BSSMAP extension information, the pre-Rel-6 information elements in the first AN-APDU and the Rel-6 information elements in the BSSMAP extension information of the second AN-APDU to reconstruct the message, labelled BSSMAP2 in FIG. 11.

If the second mobile switching centre MSC-B is not Rel-6 capable, it only uses the first AN-APDU1 by reading the information relevant for pre-Rel-6 standards from the first AN-APDU1 to create the ongoing BSSMAP message, and ignores the new BSSMAP extension information in the second AN-APDU2.

In the described example, the MSC-B is shown as being capable of supporting extended BSSMAP messages, and so the BSSMAP message with the extension data (Rel-6 information elements) is shown as being constructed from the two AN-APDUs which it receives. In addition, the second mobile switching centre MSC-B can return a handover response message which indicates whether or not the second mobile switching centre MSC-B supports extended BSSMAP messages (EXT_BSSAP supported (Y/N)). The first MSC can then use this information to decide whether it will continue sending enhanced information to the second switching centre or not.

The embodiments of the invention described above have a number of significant advantages in dealing with enhanced information in BSSMAP messages which would exceed the current length restriction. In particular, effectively the current BSSMAP message length restriction is removed. The solution is standards independent, and so is applicable both in the European Telecoms Standards Institute (ETSI) as well as in the American National Standards Institute (ANSI) environments.

Although the invention has been described above with reference to BSSMAP signalling, it will readily be appreciated that the same principle can be applied to DTAP signalling, where the discrimination bit D is set to zero, but the first and second extension indicators E1 and E2 can be utilised in the same way as with BSSMAP messages.

The existing design principles at the A interface can be maintained, because the arrangement is backwards compatible. That is, the enhanced information is only used when it can be supported across the A-interface by both the sending and receiving entities. In particular, it is possible to send information at an early stage in the message exchange between two network entities. An example of this is the HANDOVER REQUEST message which typically contains information crucial for the ongoing handover process execution. Such information should be available as soon as possible for target RAN [Radio Access Network] during handover resource allocation phase.

As described above, the invention is applicable in both connectionless and connection-oriented procedures.

The invention claimed is:

1. A method, comprising:
   directing transmission of, from a first network entity to a second network entity, an establishment message providing a first indication which indicates whether the first network entity is capable of handling extended messages;
   receiving at the first network entity an establishment response message which provides said first indication with respect to the second network entity; and
   directing transmission of a data message from the first network entity to the second network entity, said data message selectively comprising a first extended message dependent on the first indication received in the response message, said data message further providing a second indication which indicates whether the data message comprises the first extended message, wherein the establishment message, the establishment response, and the data message are base station sub-system application part messages, and wherein at least one of the first network entity or the second network entity is a mobile switching center;
   wherein at least one of the establishment message, the data message, and the establishment response message comprises a data structure which includes a variable length message part comprising message data, the data structure further comprising a length indicator which indicates a length of the message part, the length indicator comprising one octet if the message part is not an extended message and two octets if the message part is an extended message.

2. The method according to claim 1, wherein, in at least one of the transmitting from the first network entity, the receiving of the establishment message, and the transmitting of the data message from the first network entity, the data structure includes a data distribution unit which provides said first and second indications.

3. The method according to claim 1, wherein, in at least one of the transmitting from the first network entity, the receiving of the establishment message, and the transmitting of the data message from the first network entity, a data distribution unit provides a discrimination parameter between base station sub-system management application sub-part messages and direct transfer application sub-part messages.

4. The method according to claim 1, wherein, in at least one of the transmitting from the first network entity, the receiving of the establishment message, and the transmitting of the data message from the first network entity, at least one of the establishment, data, and response message comprises base station sub-system management application sub-part messages.

5. The method according to claim 1, wherein in at least one of the transmitting from the first network entity, the receiving of the establishment message, and the transmitting of the data message from the first network entity, at least one of the establishment, data, and response message comprises direct transfer application sub-part messages.

6. The method according to claim 1, wherein in at least one of the transmitting from the first network entity, the receiving of the establishment message, and the transmitting of the data message from the first network entity, at least one of the establishment, data and response messages comprises handover messages.

7. The method according to claim 1, wherein, in the transmitting of the data message from the first network entity, the data message comprises basic data that includes information elements in accordance with standards prior to Rel-6, and extension data that includes information elements in accordance with the Rel-6 standard.

8. The method according to claim 1, further comprising: storing the first indication regarding the first network entity at the second network entity for use in a subsequent message exchange.

9. A method according to claim 8, further comprising: storing the first indication regarding the second network entity at the first network entity for use in a subsequent message exchange.

10. An apparatus, comprising:
a processor configured to cause a connection to be made to a wireless communications network and to formulate a first message having a data structure which includes a data distribution unit providing first and second extension indications, and a variable length message part, wherein the first extension indication indicates whether the apparatus is capable of handling extended messages, and the second extension indication indicates whether the first message comprises an extended message, wherein the first message is a base station sub-system application part message, wherein a sender or receiver of the first message is a mobile switching center; and
wherein the data structure further includes a length indicator which indicates a length of the variable length message part, the length indicator comprising one octet if the message part is not an extended message and two octets if the message part is an extended message.

11. The apparatus according to claim 10, wherein the processor is further configured to formulate an establishment message wherein said first extension indication is set to indicate that extended messages are supported.

12. The apparatus according to claim 11, further comprising:
a receiver configured to receive a response message to said establishment message,
wherein the processor is further configured to examine the first extension indication in said response message and determine, based on said first extension indication, whether a transmitting network entity which transmitted the response message supports extended messages.

13. The apparatus according to claim 12, further comprising:
a memory configured to store information on whether said transmitting network entity supports extended messages.

14. The apparatus according to claim 10, wherein the data structure includes a discrimination parameter which discriminates between base station sub-system management application sub-part messages and direct transfer application sub-part messages.

15. The apparatus according to claim 10, wherein a base station sub-system is configured to formulate the first message.

16. The apparatus according to claim 10, wherein a mobile switching center is configured to formulate the first message.

17. A non-transitory computer-readable storage medium having a data structure stored thereon, the data structure comprising:
a data distribution unit comprising first and second extension indications: and
a variable length message part,
wherein the first extension indication provides an indication as to whether a network entity transmitting a message in accordance with the data structure is capable of handling extended messages, and wherein the second extension indication indicates whether the message is an extended message, wherein the message is a base station sub-system application part message, wherein the network entity transmitting the message or a network entity receiving the message is a mobile switching center; and
wherein the data structure further includes a length indicator which indicates a length of the variable length message part, the length indicator comprising one octet if the message part is not an extended message and two octets if the message part is an extended message.

18. A non-transitory computer-readable storage medium encoded with instructions, configured to control a computer to perform a process, comprising:
directing transmission of, from a first network entity to a second network entity, an establishment message providing a first indication which indicates whether the first network entity is capable of handling extended messages;
receiving at the first network entity an establishment response message which provides said first indication with respect to the second network entity; and
directing transmission of a data message from the first network entity to the second network entity, said data message selectively comprising a first extended message dependent on the first indication received in the response message, said data message further providing a second indication which indicates whether the data message comprises the first extended message, wherein the establishment message, the establishment response, and the data message are base station sub-system application part messages, and wherein at least one of the first network entity or the second network entity is a mobile switching center;

wherein at least one of the establishment message, the data message, and the establishment response message comprises a data structure which includes a variable length message part comprising message data and a length indicator which indicates a length of the message part, the length indicator comprising one octet if the message part is not an extended message and two octets if the message part is an extended message.

19. An apparatus, comprising a processor configured to:

direct transmission of, to a network entity, an establishment message providing a first indication which indicates whether the apparatus is capable of handling extended messages;

receive an establishment response message which provides said first indication with respect to the network entity; and direct transmission of a data message to the network entity, said data message selectively comprising a first extended message dependent on the first indication received in the response message, said data message further providing a second indication which indicates whether the data message comprises the first extended message, wherein the establishment message, the establishment response, and the data message are base station sub-system application part messages, and wherein at least one of the first network entity or the second network entity is a mobile switching center;

wherein at least one of the establishment message, the data message, and the establishment response message comprises a data structure which includes a variable length message part comprising message data and a length indicator which indicates a length of the message part, the length indicator comprising one octet if the message part is not an extended message and two octets if the message part is an extended message.

20. The apparatus according to claim 19, wherein the data structure includes a data distribution unit which provides said first and second indications.

21. The apparatus according to claim 19, wherein a data distribution unit provides a discrimination parameter between base station sub-system management application sub-part messages and direct transfer application sub-part messages.

22. The apparatus according to claim 19, wherein at least one of the establishment, data, and response message comprises base station sub-system management application sub-part messages.

23. The apparatus according to claim 19, wherein at least one of the establishment, data, and response message comprises direct transfer application sub-part messages.

24. The apparatus according to claim 19, wherein at least one of the establishment, data and response messages comprises handover messages.

25. The apparatus according to claim 19, wherein the data message comprises basic data that includes information elements in accordance with standards prior to Rel-6, and extension data that includes information elements in accordance with the Rel-6 standard.

26. The apparatus according to claim 19, further comprising:

storing the first indication regarding the network entity at the apparatus for use in a subsequent message exchange.

27. An apparatus, comprising:

means for directing transmission of, to a network entity, an establishment message providing a first indication which indicates whether the apparatus is capable of handling extended messages;

means for receiving an establishment response message which provides said first indication with respect to the network entity; and means for directing transmission of a data message to the network entity, said data message selectively comprising a first extended message dependent on the first indication received in the response message, said data message further providing a second indication which indicates whether the data message comprises the first extended message, wherein the establishment message, the establishment response, and the data message are base station sub-system application part messages, and wherein at least one of the first network entity or the second network entity is a mobile switching center;

wherein at least one of the establishment message, the data message, and the establishment response message comprises a data structure which includes a variable length message part comprising message data and a length indicator which indicates a length of the message part, the length indicator comprising one octet if the message part is not an extended message and two octets if the message part is an extended message.

28. A method, comprising:

directing establishment of a connection to a wireless communications network and formulating a first message having a data structure which includes a data distribution unit providing first and second extension indications, and a variable length message part, wherein the first extension indication indicates whether an apparatus is capable of handling extended messages, and the second extension indication indicates whether the first message comprises an extended message, wherein the first message is a base station sub-system application part message, and wherein a sender or receiver of the first message is a mobile switching center;

wherein the data structure further includes a length indicator which indicates a length of the variable length message part, the length indicator comprising one octet if the message part is not an extended message and two octets if the message part is an extended message.

29. The method according to claim 28, further comprising:

formulating an establishment message wherein said first extension indication is set to indicate that extended messages are supported.

30. A non-transitory computer-readable storage medium encoded with instructions configured to control a computer to perform a process, the process comprising:

directing establishment of a connection to a wireless communications network and formulating a first message having a data structure which includes a data distribution unit providing first and second extension indications, and a variable length message part, wherein the first extension indication indicates whether an apparatus is capable of handling extended messages, and the second extension indication indicates whether the first message comprises an extended message, wherein the first message is a base station sub-system application part message, wherein a sender or receiver of the first message is a mobile switching center, and wherein the data structure further includes a length indicator which indicates a length of the variable length message part, the length indicator comprising one octet if the message part is not an extended message and two octets if the message part is an extended message.

31. An apparatus, comprising:

means for directing establishment of a connection to a wireless communications network and means for formulating a first message having a data structure which includes a data distribution unit providing first and second extension indications, and a variable length message part, wherein the first extension indication indicates whether the apparatus is capable of handling extended messages, the second extension indication indicates whether the first message comprises an extended message, wherein the first message is a base station subsystem application part message, and wherein a sender or receiver of the first message is a mobile switching center;

wherein the data structure further includes a length indicator which indicates a length of the variable length message part, the length indicator comprising one octet if the message part is not an extended message and two octets if the message part is an extended message.

* * * * *